F. GIESEKE.
ADJUSTABLE KNUCKLE JOINT FOR AUTOMOBILES.
APPLICATION FILED DEC. 21, 1917. RENEWED AUG. 18, 1921.
1,396,324. Patented Nov. 8, 1921.
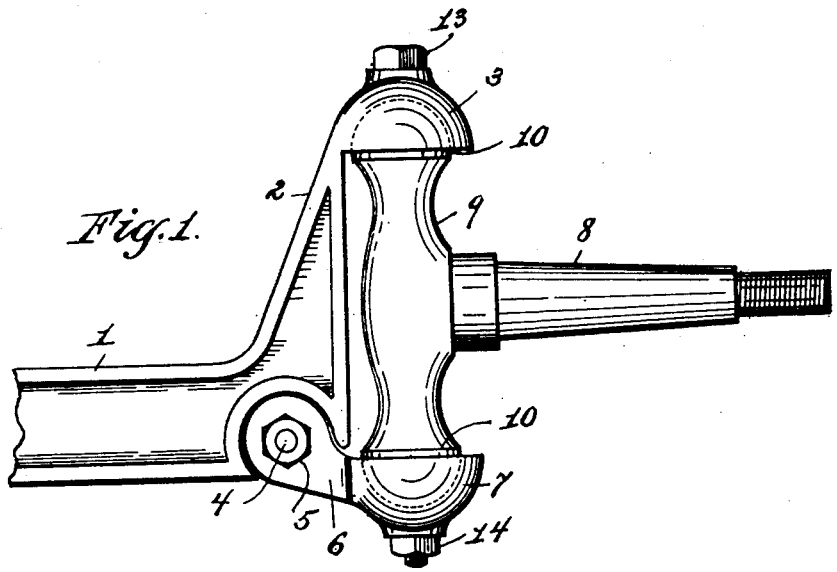
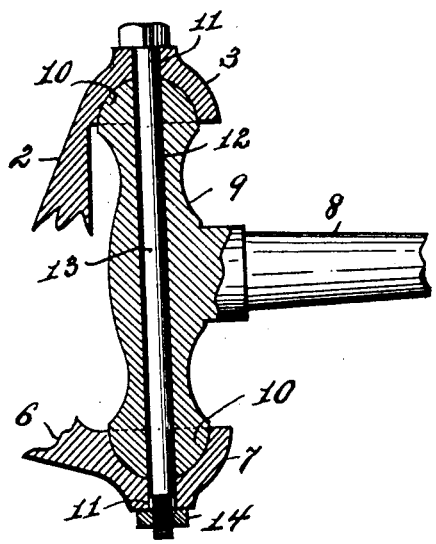
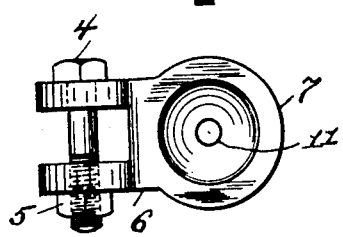
INVENTOR
Frederick Gieseke
BY Fredk C. Fischer
ATTORNEY

UNITED STATES PATENT OFFICE.

FREDERICK GIESEKE, OF IRVINGTON, NEW JERSEY, ASSIGNOR OF ONE-HALF TO JULIUS GLOR, OF IRVINGTON, NEW JERSEY.

ADJUSTABLE KNUCKLE-JOINT FOR AUTOMOBILES.

1,396,324.   Specification of Letters Patent.   Patented Nov. 8, 1921.

Application filed December 21, 1917, Serial No. 208,226. Renewed August 18, 1921. Serial No. 493,437.

*To all whom it may concern:*

Be it known that I, FREDERICK GIESEKE, a subject of the Emperor of Germany, residing in the town of Irvington, in the county of Essex and State of New Jersey, have invented certain new and useful Improvements in Adjustable Knuckle-Joints for Automobiles; and I do hereby declare that the following is a full, clear, and exact description of the invention, such as will enable others skilled in the art to which it appertains to make and use the same, reference being had to the accompanying drawings, and to the figures of reference marked thereon, which form a part of this specification.

My invention relates to improvements in adjustable knuckle joints for automobiles. The ordinary steering knuckle bolt which connects the axle spindle to the end of the front axle of the automobile soon acquires a considerable amount of lost motion due to the wear thereof and to the movable parts engaged in the same. A loose knuckle bolt or joint, is objectionable because of the rattling noise it causes when the automobile is in use and also on account of the lost motion which it causes between the steering gear and the knuckle bolt, which results that the steering gear fails to respond promptly to the control of the driver. The object of my invention is to construct a steering knuckle which may quickly be adjusted to positively take up any wear between the same and the parts in engagement therewith, thereby avoiding the objections above referred to, and which consists in providing the end of the front axle of an automobile with an upwardly extending arm terminating preferably in an integral semi-spherical socket or bearing and an adjustable bracket also provided with a semi-spherical socket or bearing, and interposing between said bearings a knuckle provided with semi-spherical bearing ends engaging the said semi-spherical bearings and uniting the parts together by means of a spindle whereby the same may be locked in adjusted position.

With the foregoing and other objects in view, which shall appear as the description proceeds, the invention resides in the combination and arrangement of parts and in the details of construction hereinafter described in the claim, it being understood that changes in the precise embodiment of invention herein disclosed can be made without departing from the spirit of the invention.

Referring to the accompanying sheet of drawings in which I have illustrated one preferable embodiment of my invention, 60

Figure 1 represents the invention in side elevation.

Fig. 2 represents a longitudinal section, and

Fig. 3 represents a plan view of the adjustable bracket. Similar characters of reference refer to like parts throughout the specification and drawings.

Referring to the drawings, 1 represents the end of the front axle of an automobile provided with an upwardly extending arm 2 terminating in a semi-spherical socket or bearing 3. Secured to the lower portion of the axle 1, by means of a bolt 4 and nut 5, is an adjustable bracket 6 also provided with a semi-spherical socket or bearing 7, corresponding with the semi-spherical socket or bearing 3. The movable axle end 8 is provided with a knuckle 9, the extremities of said knuckle being provided with semi-spherical ends 10—10 designed to be received into, and operate in, the semi-spherical sockets or bearings 3 and 7. The semi-spherical sockets or bearings 3 and 7 are provided with apertures 11 in alinement with the bore 12 of the knuckle 9 to receive the spindle 13 which is extended through the bearing 3 and the bearing 7 in the bracket 6, the spindle 13 being reduced and threaded at its lower end to receive the nut 14, bearing against the under side of the adjustable bracket 6.

To the upper end of the spindle an oil chamber may be secured, (not shown) communicating with the bore 12. 95

In assembling the device it only becomes necessary to insert the upper semi-spherical end 10 of the knuckle 9 into the bearing 3 and then adjust the bracket 6 until the opposite semi-spherical end 10 of the knuckle 9 100 is in engagement with the bearing 7 and then passing the spindle 13 through the bearings and knuckle whereby the same may be locked in adjusted position by means of the nut 14. Should the knuckle at any time 105 fail to respond promptly to the control of the driver on account of any lost motion between the parts, it will only be necessary to tighten up on the nut 14 to again lock the parts in adjusted position. It will thus be 110 seen that I have provided an adjustable knuckle joint for automobiles and the like, and reduced the actual number of essential parts to three, namely; an axle end, an adjustable bracket provided with bearings, and a knuckle to be interposed between said bearings; that when assembled, the possibility of the parts becoming separated has been reduced to a minimum.

Experience has demonstrated that the organization above described is a practical and efficient one for accomplishing the ends sought by this invention. The construction may, however, be varied in detail by those skilled in such matters, without departing from the invention.

I desire to claim the device as broadly as the state of the art will permit, and with no limitations other than such as may be expressed in the claim as it may be allowed.

Having thus described my invention, what I claim is:—

In a device of the class described, an axle end provided with an upwardly extending arm terminating in an outwardly extending and apertured semi-spherical socket or bearing, an adjustable bracket provided with an outwardly extending and apertured semi-spherical socket or bearing pivotally secured to the lower portion of said axle, and a bolt engaged with the lower end of said axle and adjustable bearing whereby the same may be locked in adjusted position, a movable axle spindle provided with an elongated apertured knuckle, the ends of said knuckle being semi-spherical and designed to be received into, and operate in, the said semi-spherical sockets or bearings, the said spindle engaged with the apertured bearings and the knuckle whereby the same may be locked in adjusted position.

This specification signed and witnessed this 18th day of December, 1917.

FREDERICK GIESEKE.

Witnesses:
 FRED'K C. FISCHER,
 JULIUS GLOR.